(12) United States Patent
Ghose et al.

(10) Patent No.: US 8,285,999 B1
(45) Date of Patent: Oct. 9, 2012

(54) SYSTEM AND METHOD FOR AUTHENTICATING REMOTE EXECUTION

(75) Inventors: Kanad Ghose, Vestal, NY (US); Erdem Aktas, Johnson City, NY (US)

(73) Assignee: The Research Foundation of State University of New York, Binghamton, NY (US)

( * ) Notice: Subject to any disclaimer, the term of this patent is extended or adjusted under 35 U.S.C. 154(b) by 413 days.

(21) Appl. No.: 12/631,839

(22) Filed: Dec. 6, 2009

Related U.S. Application Data

(60) Provisional application No. 61/120,339, filed on Dec. 5, 2008.

(51) Int. Cl.
*H04L 9/32* (2006.01)
(52) U.S. Cl. ......... 713/176; 713/170; 713/180; 713/181
(58) Field of Classification Search .................. 713/176, 713/170, 180, 181
See application file for complete search history.

(56) References Cited

U.S. PATENT DOCUMENTS

| | | | | |
|---|---|---|---|---|
| 7,337,291 | B2 * | 2/2008 | Abadi et al. | 711/163 |
| 7,574,692 | B2 * | 8/2009 | Herscu | 717/116 |
| 2007/0174750 | A1 * | 7/2007 | Borin | 714/732 |
| 2009/0113528 | A1 * | 4/2009 | Ananda et al. | 726/5 |
| 2010/0011446 | A1 * | 1/2010 | Klucher et al. | 726/27 |

* cited by examiner

*Primary Examiner* — Mohammad W Reza
(74) *Attorney, Agent, or Firm* — Steven M. Hoffberg; Ostrolenk Faber LLP

(57) ABSTRACT

With the widespread use of the distributed systems comes the need to secure such systems against a wide variety of threats. Recent security mechanisms are grossly inadequate in authenticating the program executions at the clients or servers, as the clients, servers and the executing programs themselves can be compromised after the clients and servers pass the authentication phase. A generic framework is provided for authenticating remote executions on a potentially untrusted remote server—essentially validating that what is executed at the server on behalf of the client is actually the intended program. Details of a prototype Linux implementation are also described, along with some optimization techniques for reducing the run-time overhead of the present scheme. The performance overhead of this technique varies generally from 7% to 24% for most benchmarks, as seen from the actual remote execution of SPEC benchmarks.

18 Claims, 2 Drawing Sheets

SYSTEM AND METHOD FOR AUTHENTICATING REMOTE EXECUTION

BACKGROUND OF THE INVENTION

1. Introduction

As distributed systems become pervasive, security mechanisms have to be geared up to meet the increasing threats against such systems. Existing security mechanisms for distributed systems rely on the authentication of the clients and servers and on the protection of the data being processed or communicated using known encryption mechanisms on secure channels. These security mechanisms are grossly inadequate in authenticating the program executions at the clients or servers, since the clients, servers and the executing programs themselves can be compromised after the clients and servers pass the authentication phase. Existing techniques that implement a dynamic root of trust based on support for Trusted Platform Modules (TPMs) [Int 04, TCG 07, MPP+ 07] represent a good first step in validating remote execution on a potentially untrusted host. A dynamic root of trust is implemented by essentially validating the signature of an executable just prior to its execution. As such, these mechanisms do not address the vulnerabilities possible at run time in large software systems that often call dynamically linked modules either locally or remotely, nor do they address the dynamic substitution of regions of the executables by malicious components in the host kernel.

Existing mechanisms for validating remote execution are directed at detecting security breaches at a remote server that executes programs on behalf of a client. Some examples of such approaches are:

The binaries of the program executing remotely can be altered or corrupted in the remote host.

The process running on behalf of the server or libraries used by it can be altered or corrupted at run time, or their binaries can be corrupted before execution.

The authentication process at the server, such as the ones used in some current solutions [Ka 07, UCT 04, HCF 04] may itself be compromised.

Unfortunately, all of the existing techniques for authenticating remote execution are impractical, or limited in the protection they offer and may have adverse performance implications, described below in Section 2. The technique presented for authenticating remote execution addresses these limitations of existing techniques. Solutions based on the validation of the code just before the execution (static validation) are not sufficient as a compromised memory management or file system module can supply the original code to the verification function while executing the compromised code. The static validation of executions is also limited in its inability to address compromises made by code injection at run-time, typical of some viruses. A need has emerged for a mechanism that validates a process at run-time. The specific problem addressed is the dynamic (that is, run-time) authentication of code running on a potentially untrusted remote server at a client's request. Such a scenario is typical in the world of today's Internet, where applications are executed on servers to serve a request from a client. Existing solutions addressing this or similar problems assume the availability of some trustworthy components at the potentially untrusted server [Ka 07, AMD 05, SPD 04, Int 04, Int 07] and the most practical and acceptable solutions available make use of the Trusted Platform Module (TPM) [Int 04, TCG 07].

2. Related Work

Implementing a software solution for validating remote execution is an open area of research and only a few practical solutions have been proposed to date. Techniques for monitoring system call sequences for intrusion detection, such as [HFS 98], can be extended for authenticating remote execution. However, these techniques will have a system-wide performance overhead. Also, an attacker who simulates the correct system call sequence using a maliciously injected code can easily mislead the system call sequence monitoring mechanism.

Baldi et al introduced the TrustedFlow protocol as one of the first approaches that authenticate the execution of code on a remote host by using idiosyncratic signatures ("tags") at specific points in the control flow path [BOY 03a, BOY 03b]. The first problem of the trusted flow protocol is in its assumption that current software technology is enough to obfuscate the functions for generating signatures. This assumption is questionable and in any case, as has been said earlier, obfuscation is never a solution for security. The second problem with the TrustedFlow approach is that an attacker can run a malicious program and the original program simultaneously and still redirect the correct signature sequence from the original code, while the malicious code does something else. A third limitation has to do with the tampering of the code of the target program, without impacting any of the code for the obfuscated function generator. Detecting such a violation also requires additional trusted support on the remote host.

Kennell and Jamieson [KJ 03] has used the side-effects of a running process, such as the number of misses and hits on the instruction and data TLBs, performance counter values (executed instruction count, executed branch count, etc.), and a special random tag generator to generate unique signatures for a remotely executed program. It is unclear how the code for generating the signature is integrated with the executing program on the remote system. In a subsequent paper [UCT 04], Shankar et al mention the weakness of the Kennell and Jamieson's technique. Kennell and Jamieson's approach relied on the use simulators or emulators for gathering the correct checksum values that serve as the signature. Furthermore, the checkpoint locations are possibly defined statically, so an attacker can determine (by using similar simulators/emulators) the correct signatures, thereby compromising the mechanism.

Xu et al propose a technique for detecting anomalies in the execution of a program by monitoring control flow into statically identified basic blocks of the binary [XDC 04]. A fundamental limitation of this technique has to do with the static, a priori marking of basic blocks, making the technique prone to compromise. The technique of Xu et al monitors the system call sequence by altering the kernel system call trapping mechanism. This implies that any system call will trigger the anomaly detection mechanism first, resulting in serious performance degradation for other programs that are not being validated, including the OS itself. The Trusted Computing Group [TCG07] has standardized the concept of a Trusted Platform Module (TPM), a hardware device for generating and storing a secure hash value. The TPM can be incorporated into a computing platform and can serve as the basis for a root of trust [Ka 07]. Many modern processors or chipsets incorporate such a TPM [AMD 05, Int 04, MPPRS 07]. Seshadri et al [SLS+ 05] has developed a remote execution authentication mechanism, called Pioneer, based on the use of a software implementation of a root of trust. Pioneer is designed for legacy systems that lack hardware support for attestation, such as a TPM. Pioneer relies on the knowledge of the exact machine details at the executing end and relies on timing bounds to avoid any compromise on the hash used to authenticate the boot code, which is the root of trust.

Monrose et al [MWR 99] rely on the execution of traces at a verifier for participants in a SPMD style distributed computation to verify if the participants performed their computations correctly. The traces are derived from the call stack states of the participants and the technique essentially compares the call stack information of remote participants with that at the verifier. The applicability of this scheme to a general purpose distributed system is thus limited.

SUMMARY OF THE INVENTION

3. The Framework for Authenticating Remote Execution on a Potentially Untrusted Host The framework specifically addresses the aforementioned current limitations of mechanisms that implement just a dynamic root of trust. This is done by continuously validating the control flow signature of remotely executed code as they execute. This approach is extremely relevant towards implementing secure distributed systems where some parts of the system run on potentially untrusted hosts, and indeed, since trust can be breached, on any host.

The present technology provides a general framework for authenticating the executions of programs on a remote server in a distributed environment—essentially validating that what is executed at the server (or any remote device) on behalf of a client is actually the intended program, unmodified by extraneous or unintended processes. The framework for building such systems essentially provides an answer to the question "is the program running on the remote host really the program I wanted to run?"

This approach relies on the continuous validation of the control flow signatures of the program executing at the server. A verification node, which could be the client itself, continuously validates the control flow signatures for the execution at the server through a challenge-response sequence. The verifier specifies randomly-chosen points (random "checkpoints") within the control flow from a set of checkpoints identified from an a priori analysis of the executable. The verifier challenges the server to verify a control flow signature at each such checkpoint.

A random "session" key is also specified as part of the challenge and the server responds with a signature for the control flow at the specified checkpoint, combining the session key with the signature. The use of the verifier-specified random session key for generating the signature at the server also ensures that the signatures are immune to replay attacks. As a further safeguard, the generation of a signature can randomly overwrite the contents of specific hardware-maintained instrumentation registers (that are commonly found in desktop and server CPUs). By using signatures that incorporate the contents of such instrumentation registers, the generated signature for the next checkpoint within the control flow is altered, again thwarting replay attacks.

This approach is thus quite different from prior approaches to control flow validation that require source-code level modifications and use signature validation at predictable points within the control flow path.

While the present technique permits signature validation of a single application, it is also possible to use the technique to validate alternate applications and/or environments. Thus, in some cases, a plurality of signatures can be validated, with the different validations permitting different interpretation and/or action as a result. In some cases, it may be preferable to validate a series of signatures together, rather than individually. As a result, program or application execution need not be stalled after each checkpoint during signature verification.

The framework has infrastructures to support a variety of signature generation schemes as well as the associated functions that are required as part of the signature validation process. The current Linux prototype executing on X86 and X86/64 based hosts incorporate a variety of optimizations for reducing the run time overhead of the authentication mechanism. The performance overhead varies generally from 7% to 24% for most benchmarks, as seen from the actual remote execution of representative SPEC benchmarks. The prototype implementation uses the addresses and outcomes of the last four branch instructions that are executed (as held in some specific instrumentation registers called Model Specific Registers, MSRs), cache miss statistics (again, held in MSRs) and user-level data constraints for the signatures.

It is noted that some of this overhead can be abated by providing specific hardware support in the processor for the scheme, which will permit a composite of monitoring and interjection, and thus potentially reduce the overhead required. However, as presented herein, the framework is shown to be compatible with existing and general purpose processors and operating systems, and such dedicated hardware is not required.

The present technology thus provides a generic framework for validating the execution of binaries, supplied by a client, on a remote server (hereafter called the Compute Server, CS). The CS is a potentially untrusted host. The process can also be applied symmetrically, to validate the server from the client, and the client from the server (replicating the critical functions at each side). Indeed, using a trusted third party, both client and server can be independently validated. In some cases, collusion between a client and a server can be limited, especially if a critical system function, which prevents total circumvention without reengineering the entire system, is integrated with the validation process.

3.1. Assumptions

A particular goal of the present technology is to validate the execution of code on a potentially untrusted server, even though part or all of these servers, including the operating system on the servers, might be compromised. Short of re-executing the binaries on a trusted host and verifying the results (or signatures) against those from the untrusted host, nothing can be done to validate the execution on the untrusted host. Validating executions on a host where all components are suspect is thus not practically viable. Instead, reliance is placed on the following trusted components within the CS:

1. There is a secure storage on the server for a key supplied by the client. In an alternative embodiment, this key may be provided by the authentication server. The framework needs to keep all sensitive data (i.e. checkpoint locations, keys for secure channels, and information related to checkpoints) encrypted on the CS. The key (called the master key) for encrypting and decrypting such data and the related encryption and decryption functions, in turn, have to be themselves kept secure. It is assumed that a secure storage mechanism to store and secure the master key is available. Such storage can be implemented using a dynamic root of trust mechanism built on TPM support, as described in [Int 07]. Alternatively, dedicated hardware support can be provided for storing the client-supplied key securely.

2. At least two new system calls (described later in Section 3.3) are trusted. This can again be implemented using a dynamic root of trust mechanism, as in [Int 07, SLQP 07] because the two new system calls in question are relatively short and authenticating them prior to their execution may still be practically viable. This assumption does not translate to a strict requirement, but is more of a matter of convenience and performance, as the two system calls as well as the interrupt handler can be validated using the present validation mechanism or using a dynamic root of trust mechanism.

3. Library functions on the server that are called by the program being validated are secure. Section 5 shows how the present solution can be extended to validate these library functions.

4. The communications between the server and the client takes place on secure channels.

The two trusted system calls mentioned above are described later in Sections 3.3.2 and 3.3.3.

3.2. The Major Components of the Framework

The Framework consists of the following components:

- A static analyzer that runs at the client that requests the execution of a program on a remote server. The remote server (called the computation server, CS) is potentially untrusted. This analyzer identifies the locations of the control flow checkpoints and determines their associated signatures.
- A challenge generator that runs on a trusted host that performs the authentication checks. This host (called the authentication server, AS) could be the client machine itself. The challenge generator sends a list of randomly chosen checkpoints that need to be enabled for signature generation and other information to prevent replay attacks.
- A checkpoint enabling module that runs on the remote and potentially untrusted host, CS. This module enables the specified checkpoints by dynamically inserting calls to functions for generating signatures and stores the original information at the location of these calls for later restoration during the actual execution of the program being validated. This module is invoked through one of the trusted system calls (Sec. 3.1).
- A signature generator that runs on the CS and generates control flow signatures at the enabled checkpoints. The signature generator is invoked through the second of the trusted system call mentioned in Sec. 3.1. The generated signature is sent to the AS on secure channels as the response to a challenge. Some additional processing is required in the signature generation step as described later.
- A signature verifier that runs on the AS, whose role is to verify if the response to a challenge matches the expected signatures and takes appropriate actions on potential validation failures. FIG. 1 depicts the various hosts and the messages they exchange as part of the authentication process in the framework.

These various components may be distributed on different hosts or processors, or co-located on a single processing system, such as a single processor device (with one or multiple cores) and associated memory. It is preferred that three separate and separated portions of the system interoperate, however this is not a limitation of the framework per se.

DETAILED DESCRIPTION OF THE PREFERRED EMBODIMENTS

3.3. Functional Components of the Framework

3.3.1 The Static Analyzer

Figure 1:
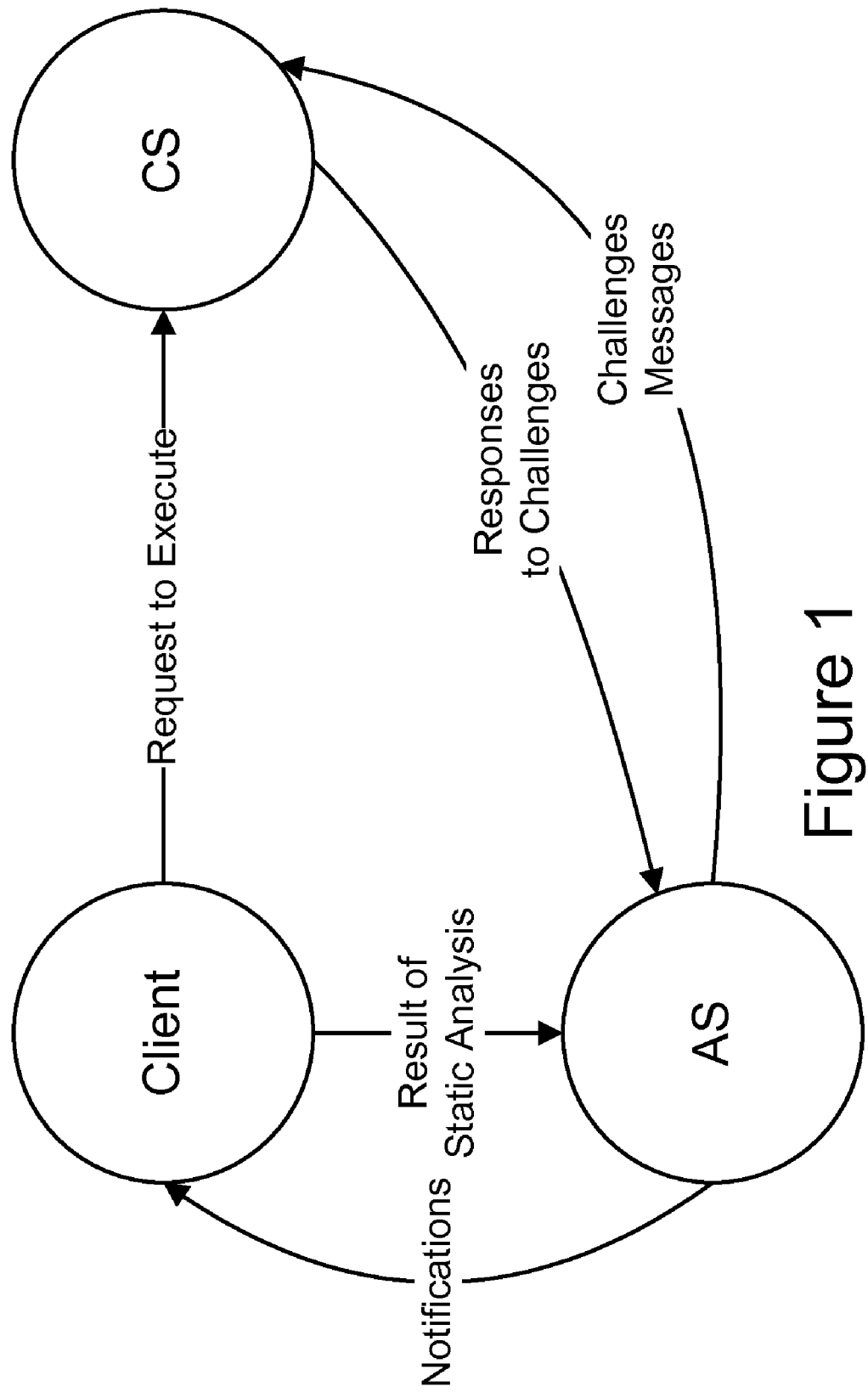
FIG. 1 shows a schematic diagram of hosts in the framework and the types of messages they exchange (in bold).

A static analyzer is used on the client side to perform a basic block level data flow analysis of the binaries of the program whose remote execution has to be authenticated. This analysis derives and uses control flow probabilities into basic blocks as is routinely done in many modern optimizing compilers. (A basic block is a set of consecutive instructions that does not have any branch.) The frequently called functions ("call blocks") are first identified, and then the basic blocks within each such call block are analyzed. A call block is a series of basic block starting from the call instruction and ending with a ret instruction.

Detecting the dynamically linked functions is easy but deciding the critical local functions that are called frequently is not as easy. To identify the most critical basic blocks; that is blocks with the higher execution frequencies, a jump tree that holds calls and indirect jump sequences for each call block is generated. An automated utility is provided to implement this step. This utility program generates the basic blocks, their call frequencies and constructs the jump table. For added flexibility, the framework permits the programmer to modify the critical basic block list produced by the analyzer.

This static analysis identifies a full set of checkpoints within the most-likely control paths, located at the entry point to the most frequently executed basic blocks and ensures an acceptable level of coverage for verifying the control flow within the program as it executes. This analysis also generates information that can be incorporated into verifiable signatures at each of these checkpoints.

3.3.2 The Checkpoint Enabling Module

This module is implemented as a system call, "sys_startcheck", which selects a random subset of the checkpoints from the full set of such checkpoints, with the random selection specified by the verifier. This random selection also ensures that a good coverage of the control flow path. sys_startcheck( ) is invoked once before application is run to request a challenge from the verification server. The verification server will respond with challenge that includes a randomly generated tag value (hereafter called the session tag) and a list of checkpoint locations. After receiving the checkpoint list, the original codes at checkpoints will be substituted with system call for signature generation and the original binary contents at each such location will be saved. These original contents are restored after successful signature generations and verifications at the checkpoints to enable the original executions to continue.

3.3.3 The Signature Generator

The signature generator is implemented as another system call, "sys_checkpoint", which is inserted, along with one or more additional instructions, by the call to "sys_startcheck" at each of the randomly-chosen checkpoints. A call to sys_checkpoint( ) does the following:

a) Collects the signature-specific information and generate the signature for the current checkpoint location. The exact nature of the signature can be chosen as described in Section 4.

b) Encrypts and sends the signature combined with the session tag to the authentication server.

c) Receives the response from the authentication server and take appropriate action depending on the response. The authentication server can send a new list of the checkpoint locations, or modify the existing list of checkpoint locations by adding or deleting checkpoint locations.

d) Patches the original code in the previously passed checkpoint with a call to "sys_checkpoint" to permit signatures to be generated correctly if a signature generation is required at a future time at this previous checkpoint. The original bit sequence at the previous checkpoint's location is saved before this patchup.

e) Copies back the original binary contents to the current checkpoint location, change the processor's program counter register's (e.g., X86 eip register) value appropriately and let the original execution continue until the next checkpoint.

3.3.4 The Challenge Generator and Verifier

The challenge generator is called by the signature verifier component when needed. When the verification commences, the CS will wait on a challenge from the AS. As this initial challenge, the AS will send a list of randomly selected checkpoint locations, as described earlier. This random selection and enabling of checkpoints makes it very difficult to predict the sequence of signatures expected as responses to subsequent challenges by the AS. In effect, the possibility of pre-executing the program on a remote host and generating the signatures in advance for later replay by the untrusted CS, in an effort to deceive the AS, is dramatically reduced. To see this, suppose N call blocks are provided, and each call block has m basic blocks that are critical—that is, have high execution frequencies. The challenge generator will randomly select k basic blocks from these m basic blocks at the beginning of the challenge. Therefore, the total number of different checkpoint locations in the checkpoint list will be equal to $C(m,k)^N$ where $C(x,y)$ stands for the combination function. As an example if N=200, m=10, and k=3 (which are fairly representative of a small to medium-sized application) then, the total number of different outcomes is $(10!/3!\times[10-3]!)^{200} \approx 1.2 \times 10^{400}$. this low probability of predicting a specific random sequence of signatures makes it possible for the framework to certify typical remote executions as genuine. If this is not enough, the framework permits the AS to alter the list of enabled checkpoints dynamically. In fact, as described in Section 8, a similar mechanism is used to handle checkpoint within loops and for reducing the associated performance penalty.

3.3.5 Dynamic Checkpoint Enabling

According to one embodiment of the invention, the granularity of checkpoint insertion can be controlled based on responses from the signature verifier. Thus, a response from the signature verifier may trigger insertion of additional checkpoints, or removal of checkpoints, from the series of instructions comprising the program. Software code executing at the CS is therefore operative to modify the program, as appropriate. The AS has corresponding signatures against which to verify execution in dependence on the controlled dynamic state of the CS.

4. The Nature of the Signature

The crux of the authentication mechanism lies in the ability to characterize the unique, expected control flow signatures at dynamically and randomly chosen checkpoints from a set of pre-generated checkpoints. The signature at a checkpoint is multi-dimensional in nature and has various components that identify the execution path taken to the checkpoint as well as components that are indicative of the state of execution at the checkpoint. To derive a signature, a variety of information maintained in MSR registers can be used, such as number of cache hits, stall cycle count, sequence of past few system calls and other such information. Contents of general purpose registers can also be used as signature components. In general, a signature has some exact components (specific register values, last few branch instruction addresses, last system call id), as well as components ("inexact values") that can be matched to expected values within a given range of deviations (such as number of cache hit, committed instruction counts, stall cycle counts etc.). (Committed instruction counts are not exact; program branches can cause variations.) Because of these two diverse class of components in the signature, signature verification is not just a comparison for equality but rather a mix of comparison for equality and comparison for matched within a pre-specified range.

The actual signature generated can also use constraints based on specific register values (regular registers, not MSRs) and verify, for example, if the value of register X is strictly greater than the value of register Y. In general, the more the number of components used in a control flow signature, the better are the chances of producing a unique signature for the control flow path to the point of verification.

Given the features of contemporary hardware, a variety of practically viable, robust and unique signatures may be defined for a checkpoint. A number of approaches for identifying and using exact and "inexact" components for a control flow signatures, that allow a unique control flow signature to be associated with a control flow path, are possible.

The framework incorporating the present technology is, in fact, a generic framework, applicable to many different types of programmable devices with sufficient complexity to meet the presumption of a low probability that a specific state can be predicted and that specific state then counterfeited. Typically, the class of problems addressed encompasses programmable systems in which the software environment is subject to change, and that unauthorized or unknown changes can prove hazardous or detrimental. Systems which do not employ open software environments may use the technology, since these systems, which may be appliances, routers, or other pre-programmed devices may require authentication when they interoperate with other devices, or may within their own environment cause harm if tampered with, are modified, or suffer from hardware or software error. Users are free to choose signature components and verification functions depending on the target application's need. In the current implementation signature components chosen are unaffected by a context switch or process migration to another core. If components affected by a context switch are present, one solution will be to reinitialize them on context switches.

The framework also permits dynamic changes to be made to the signature. The authentication server can change the signature generation function on the computation server at random intervals, adding to the overall resiliency of the scheme. An additional advantage of the ability to change the signature generating function has to do with improving both the coverage and the overall performance of the validation mechanism. For example, a low overhead signature may be used in non-critical parts of the code while detailed, high-coverage signatures are be used in critical portions of the code.

5. Run-Time Validation of CS Libraries

One naïve way to implement assumption (3) of Sec. 3.1 is to statically link the library modules with the binaries of the program being validated and validate the resulting binary using the framework. Although, this approach works, it is not completely desirable, as all the advantages of dynamically linked libraries are lost. An alternative approach is to set up an interrupt handler to generate a signature on every m committed instructions where m is chosen at random and small enough for a good coverage and big enough for an acceptable performance penalty, as in [CM 05]. This, of course, requires the timer interrupt mechanism to be validated using a dynamic root of trust or similar mechanisms. Yet another approach for validating library functions will be to use the per-branch tracing mechanisms supported in some modern hardware to track each and every branch executed in the library code (Sec. 7).

The implementation of the framework for which tests are reported below does not validate the library functions, though this of course could be done. Note that this approach to validate the execution of library functions does rely on the use of some smaller (and fixed) components that are certified using a dynamic root of trust mechanism. This is still significantly better than validating these libraries before their execution using a dynamic root of trust mechanism that leaves out any run-time checks. Finally, it is preferred not to verify the actual program using the approach just described for library functions, as the signature validation approach for the program is at a more finer-grained level and thus more robust. Where a similar level of validation is necessary for the library functions, the practical choice will be to link them in statically with the program binaries and validate them like the rest of the program itself.

6. Run-Time Validation of Signatures

Run-time verification of control flow signatures proceeds as follows:
1. (CS side) Prior to commencing the actual execution, the CS connects to the verifier (AS, authentication server) over a secure channel and sends a challenge request message to the AS.
2. (AS side) As the initial challenge, the AS will send a randomly generated tag and a list of the checkpoint locations which are selected from a full-set of pre-generated checkpoint locations (Sec. 3.3.1).
3. (CS side) After receiving the checkpoint list, the CS will enable the specified checkpoints and patch the original program code with a call to "sys_startcheck", as described in Sec. 3.3.2 and starts the program execution
4. (CS side) When a checkpoint location has been reached, the CS will generate a signature, combine the signature with the randomly generated session tag received in Step 2, encrypt this signature and send it to the AS for verification. The encryption key is stored securely in the CS (Sec. 3.1).
5. (AS side) If the signature verification component in the AS validates the signature sent by the CS, it sends a go-ahead message to the CS. This go-ahead message can optionally change the set of currently enabled checkpoints and re-initialize variables/system-level activity counters when necessary. If the validation fails, the AS can enable additional checkpoint locations to scrutinize any suspicious behavior (or rule out false positives) through a more frequent challenge-response exchanges or abandon server-side execution and mark the server execution as compromised (or untrusted). The client decides on actions that have to be taken when validation fails.
6. (CS side) After receiving a go-ahead message, the server side system call restores the original binary contents for the current checkpoint and returns. Before returning to the original execution, the original code in the previously validated checkpoint location will be re-substituted with a call "sys_checkpoint" (Sec. 3.3.3) to permit a validation of the signature at this previous checkpoint, should it be required subsequently.

Figure 2:
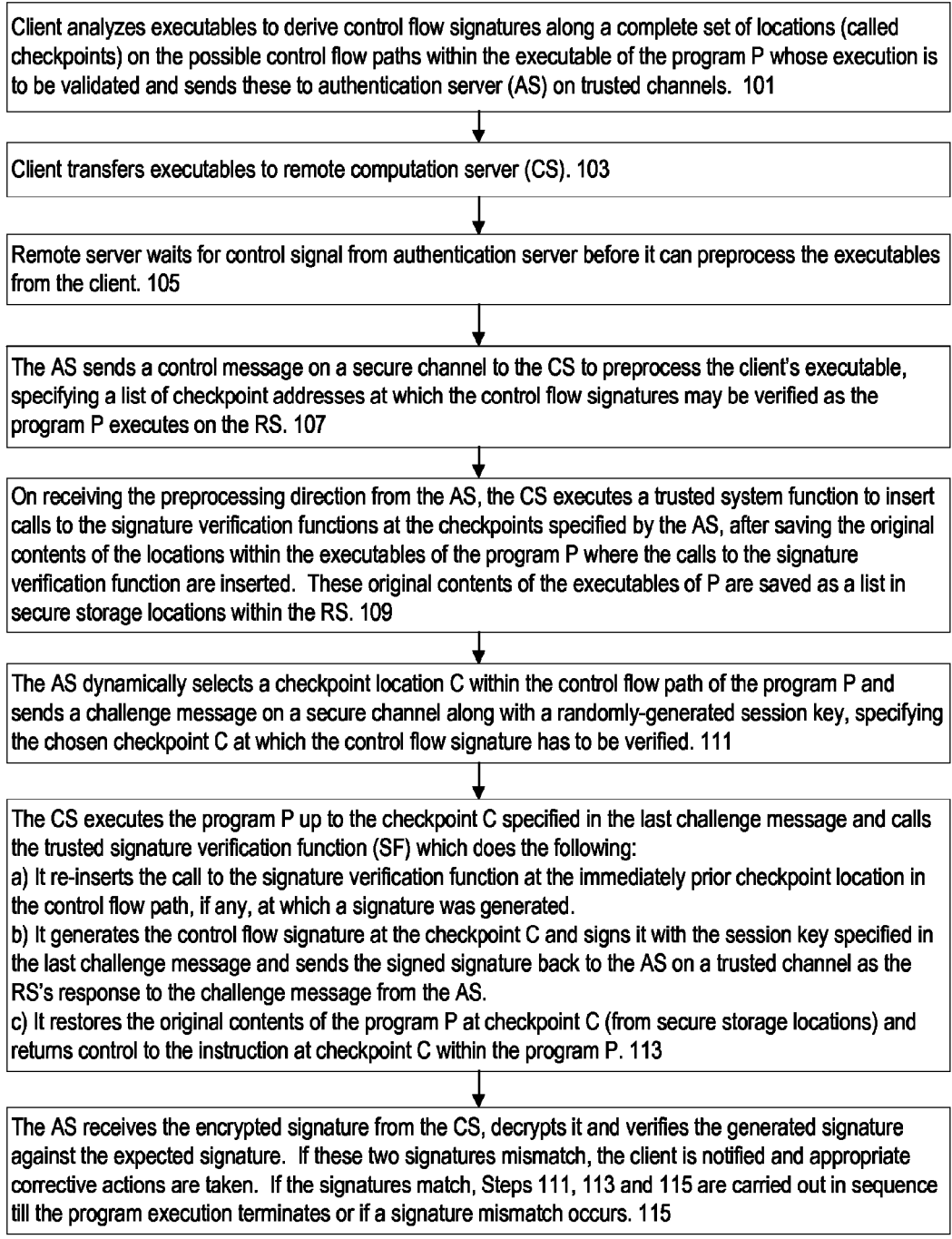
FIG. 2 shows a flowchart of an embodiment of the invention.

A flowchart showing the method according to an embodiment is shown in FIG. 2.

During the initial aspect of the process the client analyzes executables to derive control flow signatures along a complete set of locations (called checkpoints) on the possible control flow paths within the executable of the program P whose execution is to be validated and sends these to authentication server (AS) on trusted channels 101. The client then transfers executables to remote computation server (CS) 103. The remote server waits for a control signal from authentication server, before it can preprocess the executables from the client 105.

The AS sends a control message on a secure channel to the CS to preprocess the client's executable, specifying a list of checkpoint addresses at which the control flow signatures may be verified as the program P executes on the CS 107. On receiving the preprocessing direction from the AS, the CS executes a trusted system function to insert calls to the signature verification functions at the checkpoints specified by the AS, after saving the original contents of the locations within the executables of the program P where the calls to the signature verification function are inserted. These original contents of the executables of P are saved as a list in secure storage locations within the CS 109

The AS dynamically selects a checkpoint location C within the control flow path of the program P, and sends a challenge message on a secure channel along with a randomly-generated session key, specifying the chosen checkpoint C at which the control flow signature has to be verified 111. The CS executes the program P up to the checkpoint C specified in the last challenge message, and calls the trusted signature verification function (SF) 113 which does the following:
  a) It re-inserts the call to the signature verification function at the immediately prior checkpoint location in the control flow path, if any, at which a signature was generated.
  b) It generates the control flow signature at the checkpoint C and signs it with the session key specified in the last challenge message and sends the signed signature back to the AS on a trusted channel as the CS's response to the challenge message from the AS.
  c) It restores the original contents of the program P at checkpoint C (from secure storage locations) and returns control to the instruction at checkpoint C within the program P.

The AS receives the encrypted signature from the CS, decrypts it and verifies the generated signature against the expected signature. If these two signatures mismatch, the client is notified and appropriate corrective actions are taken. If the signatures match, steps 111, 113 and 115 are carried out in sequence till the program execution terminates or if a signature mismatch occurs 115.

7. Resiliency of The Framework

First, the impact of compromising the two functions calls installed at the CS are examined. If a different executable is run at the CS and these two system calls are compromised—either by substitution or through trapping and emulation—the signature generated will not match the expected signature, as the contents of the MSR registers cannot be reproduced. The signature produced at the checkpoint is very likely to have both exact and inexact components (Sec. 4) that will fail to match the expected signature. There is, of course, a pathological case, where the signature of a bogus code will match the expected control flow signature at a checkpoint. Note, however, that even with such a highly improbable "accidental" signature match at a specific checkpoint, it is practically impossible to have such matches consistently for a series of randomly chosen checkpoints. Put in other words, such accidental matches are not likely to continue across a contiguous series of checkpoints, making it possible for the scheme to easily identify bogus, unauthenticated execution at the CS on behalf of a client. What if the signature generation functions are compromised? Here again, following arguments similar to the one just made, it can easily be see that even if a single signature can be made to match the expected signature, producing a series of such matches is practically impossible.

It is also not possible to trap to an emulator from the system call for signature generation and generate the signatures correctly. To correctly reproduce some of the inexact signature components such as number of cache hits and number of stall cycles, the entire execution has to be emulated. This is because the emulation on traps cannot reproduce the states of internal hardware components such as caches, branch predictors and load miss predictors.

The framework is highly resistant to buffer overflow attacks, direct code injection or library substitution attacks since:

- The framework works on basic blocks, and these attacks limit the malicious user to compromise only one basic block without any branch, seriously limiting the extent to which the attacker can compromise the application. If the malicious code injects a branch out of the compromised block, the execution of the branch is recorded in the MSRs that keep track of branches.
- If one basic block produces unexpected results (as values stored in general registers), this basic block will be assumed as suspicious and the AS can dynamically generate additional challenges, with an increased frequency to get a higher coverage for the control flow and thus detect if the unexpected results are a consequence of compromise or a false positive.
- These attacks, in general, will affect components of the global program state, as reflected in the contents of MSRs that store cache access statistics, TLB statistics, system call statistics and other similar information. The framework can thus detect these attacks, as it includes these MSRs in the "variable" part of the signature (Sec. 4).

Provided that the assumptions of Section 3.1 are implemented as described in that section, replay attacks are not possible, as unique session tags are used for each challenge-response pair on secure channels. Also, as explained in Section 3.3.2, the use of randomly and dynamically chosen checkpoints makes it practically impossible to generate a sequence of fake signatures that match the expected signatures.

The accuracy with control flow is a function of the number of checkpoints that are dynamically enabled as the code executes. However, one has to note that the ratio of the average number of checkpoints at which signatures are verified to the number of basic blocks in the program being verified is not an indicator of the control flow coverage achieved. This is because at each checkpoint, the record of the last four braches executed (in the Pentium® 4 and the Intel® Xeon® Processor Family CPUs, this number is 16) are stored, so that an actual record is made of control flow through the 4 preceding basic blocks (recall that a basic block is a sequence of code with one entry point and one exit point, with no branches in-between the entry and exit points). Many new Intel processors also permit the logging of all executed branches in a branch trace stack in memory [Int 08]. If finer-grained control flow checking is necessary, this branch tracing mechanism can be optionally used at the cost of performance. In addition, global state information such as cache miss statistics, instruction commit rates, TLB miss rates, user-level variables provide an indirect coverage of control flow across several basic blocks and potentially for the entire control flow path up to that checkpoint.

8. Optimizations

From a performance perspective, authenticating an execution as described can have a large overhead if signatures are generated at closely spaced checkpoints. This is so as the generation of a signature requires a system call to read and update MSR registers, signature encryption and possible network communication with the AS. The return from this system call requires memory-to-memory copying to restore the bytes of the original binary that were overwritten to insert the code to call sys_checkpoint ( ) before execution continues. To reduce the communication and verification overhead, the framework buffers the generated signatures and verifies a set of signatures at each challenge but that reduction is not enough by itself for each application so the framework supplies optional performance enhancement method.

The optional approach of reducing the signature generation and verification overhead is to reduce the number of checkpoints at which signatures are generated. There is a price to be paid for this—longer sections of code are executed between verifications. The approach here is to disable signature checking at some specific checkpoints temporarily: if a specific checkpoint location is trapped and verified N times, this checkpoint location will be disabled for the execution of the next M instructions. Here, the values of N and M are highly depended to the applications and may be chosen empirically for each checkpoint or a common set of values for M and N can be used globally. The key idea is to choose M and N in a manner that keeps the verification overhead to an acceptable level.

To control the number of instructions executed after disabling a checkpoint location, the elapsed instruction counters in the current Intel processors [Int 07] are used; similar counters can be used on other platforms. The application is thus allowed to run for a while without the signature generation/validation overhead associated with a checkpoint location. This is very important for long running loops in the code. A malicious user cannot exploit this fact since it is very unlikely for such a user to guess when a checkpoint location will be disabled and for how long it remains disabled. In the current prototype, specific checkpoints are temporarily disabled by the sys_checkpoint call in response to a request from the AS that is piggybacked to the validation message from the AS to the CS. A disabled checkpoint is re-enabled by the running process itself, based on the value of the elapsed instruction counter.

9. Advantages of The Framework

The framework for validating remote execution directly addresses the limitations of existing techniques, as described in Section 2. The advantages of the framework are as follows.

- The Framework provided herein is a generic framework that can be customized to use a variety of signatures, permit users to take optional actions to change global information that form part of the signature after each validation, change the frequency of challenges and responses dynamically to tailor the tradeoff between performance and coverage.
- Automated, high-coverage checkpoint generation: Unlike other approaches, a set of checkpoints can be generated into a pool of checkpoint addresses automatically.
- Dynamic checkpoint selection and trapping: Dynamic checkpoint selection and dynamic breakpoint insertion allows us to overcome a fundamental security hole in existing solutions such as [BOY 03a, BOY 03b, HFS 98, KJ 03, XDC 04].
- Use of secure control flow signatures: To prevent the attacks like guessing the signature by using simulator like programs and/or replaying previous communication messages, the control flow specific properties are used to generate the signature of execution at each checkpoint.

Localized performance impact: From the view of performance, while the function call sequence including system call sequence for the monitored code can be checked, the framework affects only the target process/monitored code, unlike the techniques of globally intrusive mechanisms such as those of [XDC 04] and [HFS 98].

Transparency: A good security mechanism should be fully transparent to the user and also to the programmer. The framework is fully transparent to both in this respect. The programmer does not need to decide on the checkpoint list, function calls for monitoring; nor does the programmer need to worry about the configuration of the authentication entity.

10. Conclusions

A generic framework with a new approach for validating the remote execution of a program is presented, having a broad range of application in various environments. This generic framework can be applied to a large class of systems, and the presumptions made are compatible with many common systems. The present framework differs from existing approaches in its use of dynamic checkpoint selection and dynamic generation of signatures based on the control flow path and the side effects of execution. These signatures are generated using the model specific registers used for CPU and system monitoring as found in most contemporary microprocessors. For example, the implementation of a prototype system in Linux is described herein; however, other operating systems and operating environments may also be employed. A technique is provided for reducing the overhead of execution authentication on a programs run time by temporarily disabling signature generation at heavily encountered checkpoints.

An important consideration in the present execution mechanism has to do with the exact nature of the signature for control flow. In most modern desktop/laptop/server processors, the MSRs hold statistics of cache misses, accuracy of branch prediction, committed instruction count, TLB miss rates etc. The of these measures, along with explicit control flow information held in the MSRs (such as last few branches and system calls executed) are investigated to get generalized signatures of control flow that can be matched stochastically against a set of reference signatures. Such generalized signatures can possibly reduce the number of checkpoints needed and may well hold the promise of reducing the runtime overhead of the present scheme. Last but not the least; the provided execution authentication mechanism is robust.

Many variations of the invention will occur to those skilled in the art. Some variations include operating on general purpose processors, embedded processors, ASICs, FPGAs, parallel processors, graphic processors, communications processors, communcations through wired, radio frequency or optical means, and in some cases, acoustic or wireline communications, various levels of cryptographic protection and authentication of communications, fixed, context-sensitive or adaptive tolerance to deviations from nominal verification conditions, cooperation with other types of systems and/or other security features of the system, use of the profiling technology to improve system performance by, for example, detecting inefficiencies, and the like. The security system encompassed by the claims may be integrated in a single device, or distributed, and, for example, may be part of communications devices or appliances. All such variations are intended to be within the scope and spirit of the invention, which is limited only by the claims. The examples presented herein are not intended to limit the scope of the invention. It is understood that the present invention may be executed on a variety of computing platforms, both general and special purpose, implementing specific functionality as described herein.

REFERENCES

Expressly Incorporated Herein by Reference

Each of the following reference is incorporated herein by reference as if set forth in their entirety.

[AMD 05] Advanced Micro Devices, Secure Virtual Machine Architecture Reference Manual, 2005.

[Ba 02] Bill Arbaugh, "Improving the TCPA Specification," Computer, vol. 35, no. 8, pp. 77-79, August, 2002

[BOY 03a] Mario Baldi, Yoram Ofek, Moti Yung, "The TrustedFlow Protocol: Idiosyncratic Signatures for Authenticated Execution", in Proc. IEEE Workshop on Information Assurance, 2003.

[BOY 03b] Mario Baldi, Yoram Ofek, Moti Yung, "Idiosyncratic Signatures for Authenticated Execution, The TrustedFlow, Protocol and its Application to TCP", in Proc. Sym. on Comm. Systems and Networks (CSN), 2003.

[CM 05] Simon P. Chung, Aloysius K. Mok, "On Random-Inspection-Based Intrusion Detection", in Proc. of the 8-th Int'l Symp. on Recent Advances in Intrusion Detection (RAID 2005).

[HFS 98] Steven A. Hofineyr, Stephanie Forrest, Anil Somayaji, "Intrusion Detection using Sequences of System Calls", Journal of Computer Security, Vol. 6, No. 3, 1998.

[Hwu+ 93] W. Hwu et al, "The Superblock: An Effective Technique for VLIW and Superscalar Compilation", The Jrnl of Supercomputing, 1993, pp. 229-248.

[Int 04] Intel Corpn., Trusted Platform Module (TPM): Quick Reference Guide, 2004.

[Int 07] Intel Corporation, Model-specific registers and functions. Available at: http://www.intel.com/design/intarch/techinfo/Pentium/mdelregs.htm, 2007.

[Int 08] Intel Corporation, Intel® 64 and IA-32 Architectures Software Developer's Manual, Available at http://www.intel.com/products/processor/manuals/

[Ka 07] Kauer, B., "OSLO: Improving the Security of Trusted Computing", in Proc. of the 16th USENIX Security Symposium, 2007.

[KJ 03] Rick Kennell and Leah H. Jamieson, "Establishing the genuinity of remote computer systems", in Proc. 12th USENIX Security Symposium, USENIX Association, 2003.

[MPP+ 07] Jonathan M. McCune, Bryan Parno, Adrian Perrig, Michael K. Reiter, Hiroshi Isozaki, Flicker: An Execution Infrastructure for TCB Minimization, in Proc. EuroSys, 2008

[MPPRS 07] Jonathan M. McCune, Bryan Parno, Adrian Perrig, Michael K. Reiter, Arvind Seshadri, Minimal TCB Code Execution, in Proc. IEEE Symposium on Security and Privacy, 2007

[MWR 99] F. Monrose, P. Wyckoff, and A. Rubin, "Distributed Execution with Remote audit", in Proc. of ISOC Network and Distributed System Security Symposium (NDSS 99), February 1999

[SLQP 07] Arvind Seshadri, Mark Luk, Ning Qu, Adrian Perrig, SecVisor: A Tiny Hypervisor to Provide Lifetime Kernel Code Integrity for Commodity OSes, Symposium on Operating Systems Principles, 2007

[SPD 04] Arvind Seshadri, Adrian Perrig, Leendert van Doom, "Using Software Based Attestation for Verifying Embedded Systems in Cars", in Proc. Embedded Security in Cars Conference (ESCAR), 2004

[SPD 05] Elaine Shi, Adrian Perrig, Leendert Van Doom, "BIND: A Find-grained Attestation Service for Secure Distributed Systems", Proc. of the IEEE Symposium on Security and Privacy, 2005.

[SLS+ 05] Arvind Seshadri, Mark Luk, Elaine Shi, Adrian Perrig, Leendert van Doom, Pradeep Khosla, "Pioneer: Verifying Code Integrity and Enforcing Untampered Code Execution on Legacy Systems", ACM Symposium on Operating Systems Principles, 2005.

[SPEC 06] Standard Performance Evaluation Corporation. SPEC CPU2000 benchmark suite, 2000.

[Tri 07] Tripwire product pages at: http://www.tripwire.com/products/enterprise/ost/, 2007.

[TCG 07] Home page of the Trusted Computing Group at: http://www.tcg.org.

[UCT 04] Umesh Shankar, Monica Chew, J. D. Tygar. "Side effects are not sufficient to authenticate software", in Proc. 13th USENIX Security Symposium, 2004.

[XDC 04] Haizhi Xu, Wenliang Du, and Steve J. Chapin, "Context Sensitive Anomaly Monitoring of Process Control Flow to Detect Mimicry Attacks and Impossible Paths", in Proc. 7-th Int'l. Symp. on Recent Advances in Intrusion Detection, 2004 RAID 2004).

What is claimed is:

1. A distributed system which validates software executing on a programmable processor, comprising:
   a static analyzer component adapted to identify the locations of a set of control flow checkpoints and their associated expected signatures during execution of a program on a remote server;
   a challenge generator executing in a trusted environment adapted to initiate a series of authentication checks, sending a list of randomly or pseudorandomly chosen checkpoints selected from a group of available checkpoints, for which respective signatures are generated at the remote server;
   a checkpoint enabling module adapted to execute on the remote server, enabling the chosen checkpoints by dynamically inserting calls to functions for generating the respective signatures into a program at runtime wherein the calls to functions are inserted into a program without altering an amount of code within the program and storing the original information at the location of these calls for later restoration during the actual execution of the program being validated;
   a signature generator adapted to execute on the remote server adapted to generate control flow signatures at the enabled chosen checkpoints, and communicating the signature to the challenge generator in response to the chosen checkpoints; and
   a signature verifier adapted to execute in the trusted environment adapted to verify if the signature response to a respective chosen checkpoint challenge matches an expected signature.

2. The distributed system according to claim 1, wherein the challenge generator, checkpoint enabling module and signature verifier are colocated on a common processing system.

3. A system having a programmable processor adapted to be remotely verified, comprising:
   a checkpoint enabling module, enabling a series of checkpoints received from a remote system to be evaluated, by dynamically inserting calls to functions for generating respective signatures wherein the dynamically inserted calls have a non-predetermined location within a program, and are inserted without changing a size of the program code, and storing information defining a location of the calls for subsequent restoration to permit normal execution of a program being validated to continue; and
   a signature generator adapted to generate control flow signatures when called by the checkpoint enabling module, for communication and remote verification thereof.

4. The system according to claim 3, further comprising a module to interrupt execution of the program being validated if a message is received indicating a failure of remote verification.

5. The system according to claim 3, wherein a client system requests execution of the program being validated on the system, and wherein a message is communicated from a remote verification system to the client, independent of the system, selectively indicating a failure of the remote verification if a control flow signature from the signature generator, resulting from a dynamically inserted call during execution of the program, is inconsistent with the control flow signatures expected by the remote system.

6. A system which validates software executing on a remote system having programmable processor, comprising:
   a challenge generator adapted to initiate a series of authentication checks, sending a series of checkpoints, for which respective authentic signatures are known;
   the checkpoints being adapted to be processed by a checkpoint enabling module executing on a remote server, which dynamically inserts calls to functions for generating respective control flow signatures at the checkpoint location during execution of a program being validated, and then restoring execution of the program being validated wherein the dynamically inserted calls have a non-predetermined location within a program, and are inserted without changing a size of the program code; and
   a control flow signature verifier adapted to verify a respective control flow signature based on a respective checkpoint, and verify that a control flow signature received from a remote server matches an expected signature for the respective checkpoint.

7. The system according to claim 6, wherein the challenge generator, remote server, and control flow signature verifier are collocated on a common processing system.

8. The system according to claim 6, wherein the series of checkpoints represent a random or pseudorandom sequence of checkpoints selected from a set of predetermined checkpoints.

9. The system according to claim 6, wherein the series of checkpoints represent a randomly or pseudorandomly selected subset of checkpoints selected from a set of predetermined checkpoints.

10. The system of claim 6, wherein one of:
    at least one instruction in the program being verified that was replaced by the function call inserted to verify the signature at the current checkpoint is executed after return from the function call; and
    the program being verified is patched at a checkpoint location preceding the current checkpoint location, to permit correct future generation of signatures at the checkpoint location preceding the current checkpoint location.

11. A method of verifying execution of a program on a remote server, comprising:
    identifying the locations of a set of control flow checkpoints and their associated expected signatures during execution of a program on a remote server;

sending a list of randomly or pseudorandomly chosen checkpoints to the remote server;

dynamically inserting calls into the program at the respective checkpoint locations during a runtime execution of the program;

sending an alternate list of randomly or pseudorandomly chosen checkpoints to the remote server, wherein the alternate list identifies different randomly or pseudorandomly chosen checkpoints than the list; and dynamically inserting calls into the program at the respective checkpoint locations corresponding to the alternate list, prior to a subsequent runtime execution of the program;

calling a signature verification function at the respective checkpoint locations;

capturing control flow information, for each call corresponding to a checkpoint;

generating a control flow signature corresponding to the control flow information;

restoring a normal execution of the program; and communicating the control flow information from the remote server to an authentication server, for comparison with an authentic control flow signature corresponding to the checkpoint.

12. The method according to claim 11, wherein the remote server, the signature verification function, and authentication server are collocated within a common processing system.

13. A method of generating a control flow signature in response to a function call, comprising:

upon the function call from a program during execution, collecting signature-specific information and generating a signature selectively based on a current checkpoint location of a program being verified;

generating a control flow signature in response to a function call inserted prior to subsequent program execution in an alternate checkpoint location within the program whose execution is being verified, the function call replacing at least one original program instruction;

communicating an encrypted representation of the signature in conjunction with a session tag to an authentication server;

receiving a message from the authentication server and selectively responding to the message;

patching the program whose execution is being verified at a checkpoint location preceding the current checkpoint location or the alternate checkpoint location, to permit correct future generation of signatures at the checkpoint location preceding the current checkpoint location; and selectively resuming operation of the program being verified to execute an instruction subsequent to the function call, in response to the message.

14. A method of generating a control flow signature in response to a function call inserted during program execution in a checkpoint location within a program whose execution is being verified, the function call replacing at least one program instruction, comprising:

upon the function call, collecting signature-specific information and generating a signature selectively based on a current checkpoint location of a program being verified;

generating a control flow signature in response to a function call inserted during subsequent program execution in an alternate checkpoint location within the program whose execution is being verified, the function call replacing at least one original program instruction;

communicating an encrypted representation of the signature in conjunction with a session tag to an authentication server;

receiving a message from the authentication server and selectively responding to the message; and selectively resuming execution of the program being verified after the current checkpoint location or the alternate checkpoint location in response to the received message.

15. The method according to claim 14, further comprising:

executing the at least one instruction in the program being verified that was replaced by the function call inserted to verify the signature at the current checkpoint; and resuming execution of the program being verified at the instruction following the call to the signature verification function at the current checkpoint location within the program whose execution is being verified.

16. The method according to claim 14, further comprising:

patching the program being verified at a checkpoint location preceding the current checkpoint location, to permit correct future generation of signatures at the checkpoint location preceding the current checkpoint location.

17. The method according to claim 14, further comprising modifying execution of the program in dependence on the message received from the authentication server.

18. The method according to claim 13, further comprising the steps of:

accumulating the generated signature in a secure memory area;

wherein the encrypted representation of the accumulated signatures stored in the secure memory area are selectively communicating in conjunction with the session tag to an authentication server;

selectively receiving a message from the authentication server and selectively responding to the message; and clearing the secure storage area containing the accumulated signatures after the message is received from the authentication server.

* * * * *